United States Patent
Revilla et al.

(10) Patent No.: US 7,028,129 B2
(45) Date of Patent: Apr. 11, 2006

(54) METHOD AND APPARATUS FOR CONVERTING AN EXTERNAL MEMORY ACCESS INTO A LOCAL MEMORY ACCESS IN A PROCESSOR CORE

(75) Inventors: Juan G. Revilla, Austin, TX (US); Minh D. Tran, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 10/040,904

(22) Filed: Dec. 28, 2001

(65) Prior Publication Data

US 2003/0126345 A1 Jul. 3, 2003

(51) Int. Cl.
*G06F 13/00* (2006.01)
(52) U.S. Cl. ............................ 710/306; 710/308
(58) Field of Classification Search .............. 710/306, 710/308, 100, 305
See application file for complete search history.

(56) References Cited

U.S. PATENT DOCUMENTS

| | | | |
|---|---|---|---|
| 4,794,517 A | 12/1988 | Jones et al. | |
| 5,603,011 A | 2/1997 | Piazza | |
| 6,223,258 B1 * | 4/2001 | Palanca et al. | 711/138 |
| 6,389,527 B1 | 5/2002 | Raam et al. | |

FOREIGN PATENT DOCUMENTS

| | | |
|---|---|---|
| EP | 1 103 898 | 5/2001 |
| JP | 2000-231550 | 8/2000 |

* cited by examiner

*Primary Examiner*—Tim Vo
(74) *Attorney, Agent, or Firm*—Fish & Richardson P.C.

(57) ABSTRACT

A processor may include a processor core, which interprets and executes instructions, and a system bus interface, which enables the processor to communicate with a system. The system bus interface may include a fill bus and a DMA bus. The system bus interface may include a bridge between the fill bus and the DMA bus which enables the system bus interface to re-route information placed on the fill bus onto the DMA bus and back into the core.

30 Claims, 3 Drawing Sheets

METHOD AND APPARATUS FOR CONVERTING AN EXTERNAL MEMORY ACCESS INTO A LOCAL MEMORY ACCESS IN A PROCESSOR CORE

BACKGROUND

Memory in a computer system may be arranged in a memory hierarchy including memories of different speeds and sizes. The type and size of a memory device and its proximity to the processor core are factors in the speed of the memory device. Generally smaller hardware is faster, and memory devices closest to the processor core are accessed fastest. Since fast memory may be expensive and space near the processor core limited, a memory hierarchy may be organized into several levels, each smaller, faster, and more expensive per byte than the next level. The goal of such a memory hierarchy is to provide a memory system with a cost almost as low as the cheapest level of memory and speed almost as fast as the fastest level.

Many processors store copies of the most used data and instructions in a memory cache to improve access speed and overall processing speed. A memory cache, also referred to as cache store or RAM (Random Access Memory) cache, is a portion of memory which may be made of high-speed static RAM (SRAM) instead of the slower dynamic RAM (DRAM) typically used for main memory. Memory caches may be included on the same integrated circuit (IC) as the processor. Such internal memory caches are also referred to as local or Level 1 (L1) caches.

The contents of the L1 cache may change depending on the task being performed by the processor. If the processor tries to access data that is not in the cache, a cache miss occurs, and the data is retrieved from memory. Cache misses involve a performance penalty which includes the clock cycle in which the miss occurred and the additional clock cycles to service the miss. Accordingly, it may be desirable to provide a local memory, e.g., an L1 SRAM, to store data and instructions to improve access speed and reduce cache miss penalties.

DETAILED DESCRIPTION

Figure 1:
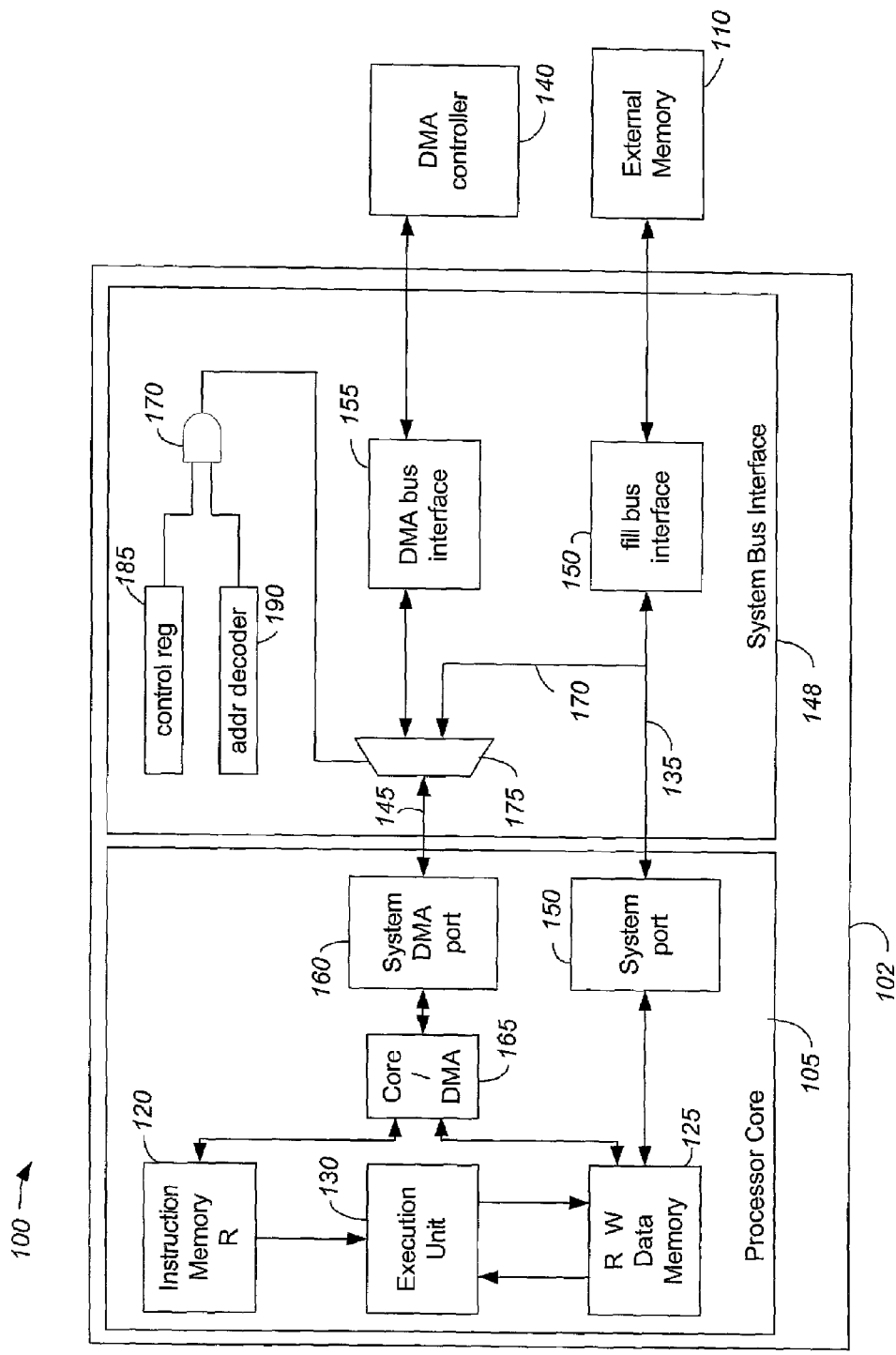
FIG. 1 is a system including a processor core and system bus interface (SBI) according to an embodiment.

FIG. 1 illustrates a system 100 according to an embodiment. The system includes a processor 102 with a processor core 105, which interprets and executes instructions. The processor core 105 may access data from an external memory 110, e.g., a Level 2 (L2) or main memory, via a system interface bus (SBI) 115. The processor 102 may be, for example, a microcontroller or a digital signal processor (DSP), which are typically used for controller-oriented applications and numerically intensive digital signal processing, respectively. The processor 102 may have a hybrid microcontroller/DSP architecture which is able to handle applications which have both DSP- and microcontroller-based components. Such a processor may be used in, for example, a cellular phone which has a workload with a large DSP component for performing the processing required for the base-band channel and the speech codes, as well as a control-oriented component for managing aspects of the user interface and communication protocol stacks.

The processor core 105 may include a local, or Level 1 (L1), memory at the highest level of the memory hierarchy. The instructions and data in the L1 memory may be separated into a local instruction memory 120 and a local data memory 125, but may share a common memory at the second and further levels of the system (L2 and lower). The separation of the instruction and data streams may enable the processor core 105 to simultaneously fetch instructions and load/store data without collisions.

The local memories may include caches that store copies of the most used data for fast retrieval by an execution unit 130. The information in the cache may be deterministic, i.e., may change depending on the tasks being performed by the processor. A cache miss may occur when the processor core 105 tries to access data that is not in the local cache. In the event of a cache miss, the requested data that is not in the local cache may be retrieved from the external memory 110. The data retrieved due to a cache miss may be transferred to the cache from the external memory via a fill bus 135. A cache miss may involve a penalty which includes the clock cycle in which the miss occurred and the additional clock cycles to service the miss.

In addition to, or in place of, the L1 cache, the processor core 105 may include local (real) memory which may be programmed with information, such as L1 SRAM in the local instruction memory 120 and the local data memory 125. Unlike the L1 cache, the information in the L1 SRAM may be addressable and does not depend on the task being performed, i.e., the information in the L1 SRAM is non-deterministic. Thus, accesses to L1 SRAM may not entail cache miss penalties. Due to its proximity to the execution unit 130, the L1 SRAM may be a relatively fast memory and may be used to store instructions and data for DSP applications, such as fast Fourier processing (FFP), correlation, and multiply-accumulate (MAC) instructions.

The execution unit 130 may read and write data to the local data memory 125 during execution of a program. The execution unit 130 may fetch instructions from the local instruction memory 120, but may not be able to write directly to the local instruction memory 120.

The system 100 may include a DMA (Direct Memory Access) controller 140. The DMA controller 140 is a specialized processor used to transfer information in or out of the local instruction memory 120 and local data memory 125 without intervention by the processor core 105. The DMA controller 140 may be external to the processor core 105 and accesses local memory through the SBI 115. The DMA controller may read and write instructions to the local instruction memory 120 and read and write data to the local data memory 125.

The SBI 115 includes the fill bus 135 and the DMA bus 145. A fill bus interface 148 handles data transfers between the external memory 110 and a system port 150. A DMA bus interface 155 handles data transfers between the DMA controller 140 and a system DMA port 160. The processor core 105 may include an internal DMA interface 165 to handle transfers between the system DMA port 160 and the local memories 120 and 125.

The SBI 115 may operate in a normal operating mode and an enhanced operating mode. In the normal operating mode, the local instruction memory 120 may not be written to directly by the processor core 105, but may be written to by the DMA controller 140. In the enhanced operating mode, the SBI 115 may re-route data on the system port 150 to the system DMA port 160 via a bridge 170 in the SBI 115 which connects the fill bus 135 and the DMA bus 145. The processor core 105 may use the bridge 170 to write directly to the local instruction memory 120.

A multiplexer 175 may be provided on the DMA bus 145. The bridge 170 may route data placed on the fill bus 155 by the system port 145 to the multiplexer 175. In the normal operating mode, the multiplexer may close the bridge and allow instructions and data to flow between the system DMA port 160 and the DMA bus interface 155. In the enhanced operating mode, the multiplexer may switch to the bridge 170 and allow instructions and data to flow between the system port 150 and the system DMA port 160.

The multiplexer 175 may be controlled by the output of an AND gate 180. The inputs of the AND gate 180 may be coupled to a control register 185 and an address decoder 190, respectively. The control register 185 may be a software programmable register which may be programmed to store a bridge-enable bit. The bridge-enable bit may be used to indicate whether the bridge is enabled or not, and hence whether the SBI 115 is in the normal or enhanced operation mode.

Figure 2:
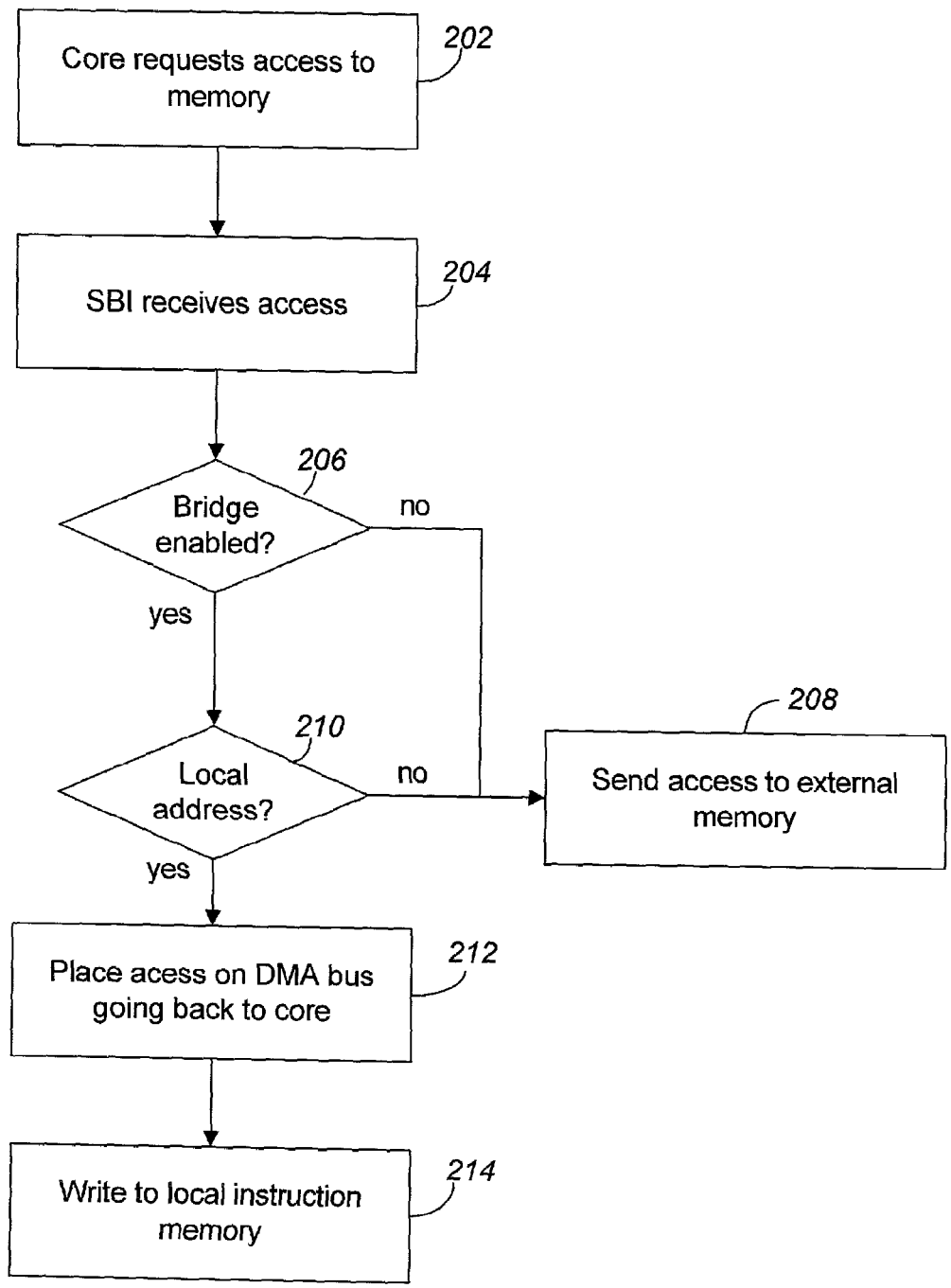
FIG. 2 is a flowchart describing an operation for enabling a processor core to write to a local instruction memory according to an embodiment.

FIG. 2 is a flowchart describing an operation 200 for enabling the processor core 105 to write the local instruction memory 120 and the local data memory 125 according to an embodiment, although the scope of the present invention is not limited in this respect. The processor core 105 may request an access to memory, e.g., a read or write access to the local instruction memory 120 (block 202). The SBI 115 receives the access request (block 204) and checks the status of the bridge-enable bit in the control register 185 (block 206). If the bridge-enable status is FALSE, i.e., the bridge-enable bit value is zero, the processor 102 may be in the normal operating mode, and the output of the AND gate 180 is FALSE. The multiplexer 175 blocks the information on the bridge 170 from being placed on the DMA bus 145, and the access request is sent to the external memory 110 (block 208).

The SBI 115 may also check the address of the target instruction or data with the address decoder 190 to determine if the address of the target to be accessed is within the address space assigned to the local memories 120 or 125 (block 210). If not, the output of the address decoder 140 is FALSE. Consequently, the output of the AND gate 180 is FALSE, and the access request may be sent to the external memory 110 (block 208).

If the bridge-enable status is TRUE, i.e., the bridge-enable bit value may be one, and the address of the target may be in the local memory address space, then the output of the AND gate is TRUE. The multiplexer 175 may switch to the bridge 175 and places the access request on the DMA bus 145 going back to the processor core 105 (block 212). If the access request is a write to the local instruction memory 120, the internal DMA interface 165 writes the information to the appropriate address in the memory 120 (block 214).

The enhanced mode may be used for testing purposes. For example, if a test chip on which a processor under development does not include a DMA controller, the processor core 105 may be used to test the internal logic of the DMA bus interface in the SBI 115. The enhanced mode may also be used to insert breakpoints in the code in the local instruction memory 120 using the processor core 105. The breakpoints may be used to test different portions and functions of the code. The enhanced mode may also be used for development purposes, such as code patching to replace portions of code in the local instruction memory 120 using the processor core 105.

The processor 102 may be implemented in a variety of systems including general purpose computing systems, digital processing systems, laptop computers, personal digital assistants (PDAs) and cellular phones. In such a system, the processor may be coupled to a memory device, such as a Flash memory device or a static random access memory (SRAM), which stores an operating system or other software applications.

Such a processor 102 may be used in video camcorders, teleconferencing, PC video cards, and High-Definition Television (HDTV). In addition, the processor 102 may be used in connection with other technologies utilizing digital signal processing such as voice processing used in mobile telephony, speech recognition, and other applications.

Figure 3:
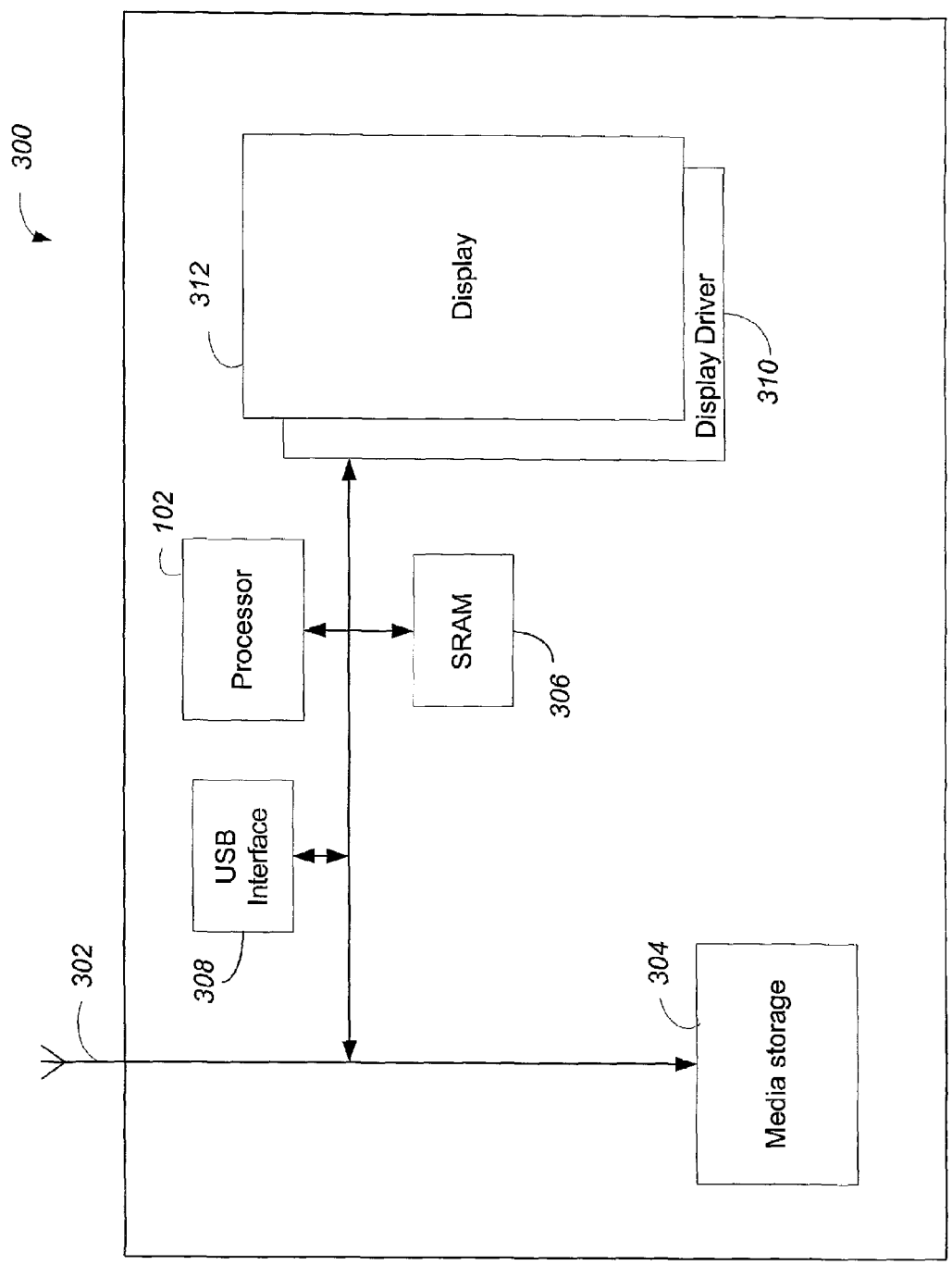
FIG. 3 is a system including a processor according to an embodiment.

For example, FIG. 3 illustrates a mobile video device 300 including a processor 102 according to an embodiment. The mobile video device 300 may be a hand-held device which displays video images produced from an encoded video signal received from an antenna 302 or a digital video storage medium 304, e.g., a digital video disc (DVD) or a memory card. The processor 102 may communicate with an L2 SRAM 306, which may store instructions and data for the processor operations, and other devices, for example, a USB (Universal Serial Bus) interface 308.

The processor 102 may perform various operations on the encoded video signal, including, for example, analog-to-digital conversion, demodulation, filtering, data recovery, and decoding. The processor 100 may decode the compressed digital video signal according to one of various digital video compression standards such as the MPEG-family of standards and the H.263 standard. The decoded video signal may then be input to a display driver 310 to produce the video image on a display 312.

A number of embodiments have been described. Nevertheless, it will be understood that various modifications may be made without departing from the spirit and scope of the invention. For example, blocks in the flowchart may be skipped or performed out of order and still provide desirable results. Accordingly, other embodiments are within the scope of the following claims.

The invention claimed is:

1. A method comprising routing a memory access from a processor core back into the processor core through a bus interface coupled to the processor core without traversing memory external to the processor core, the routing comprising:
    determining a status of a re-routing bridge in the bus interface;
    determining an address of memory to be accessed; and
    placing the access on a bus back into the processor core in response to said bridge being enabled and said address being in a local memory address space.

2. The method of claim 1, wherein said determining the status of the re-routing bridge in the bus interface comprises checking a status of a bridge-enable bit in a control register.

3. The method of claim 1, further comprising accessing a local memory.

4. The method of claim 1, wherein said routing a memory access from the processor core comprises routing a memory access from a digital signal processor core.

5. The method of claim 3, wherein said accessing local memory comprises writing instructions to a local instruction memory.

6. The method of claim 3, wherein said accessing the local memory comprises accessing a Level 1 (L1) SRAM (Static Random Access Memory).

7. Apparatus comprising:
a processor core including
a memory including a local data memory and a local instruction memory,
a first port coupled to the local data memory, and
a second port coupled to the local data memory and the local instruction memory; and
a bus interface including
a first bus coupled to the first port,
a second bus coupled to the second port,
a bridge between the first bus and the second bus, and
a multiplexing unit operative to switch between the second bus and the bridge to enable information placed onto the first bus to be re-routed into the second port without traversing memory external to the processor core.

8. The apparatus of claim 7, wherein the local memory comprises a Level 1 SRAM (Static Random Access Memory).

9. The apparatus of claim 7, wherein the first port comprises a fill port and the first port comprises a fill bus.

10. The apparatus of claim 7, wherein the second port comprises a DMA (Direct Memory Access) controller port and the second bus comprises a DMA bus.

11. The apparatus of claim 7, wherein the processor core further comprises an interface coupled to the second port, said interface being operable to access the local data memory and local instruction memory.

12. The apparatus of claim 7, wherein the memory is a local memory.

13. The apparatus of claim 11, wherein the interface is operable to write instructions to the local instruction memory.

14. An article comprising a machine-readable medium including machine-executable instructions, the instructions operative to cause:
a machine to route a memory access from a processor core back into the processor core through a bus interface coupled to the processor core without traversing memory external to the processor core;
wherein the instructions operative to cause the machine to route the memory access comprise instructions operative to:
determine a status of a re-routing bridge in the bus interface;
determine an address of memory to be accessed; and
place the access on a bus back into the processor core in response to said bridge being enabled and said address being in a local memory address space.

15. The article of claim 14, wherein the instructions operative to cause the machine to determine the status of the re-routing bridge in the bus interface is enabled include instructions operative to check a status of a bridge-enable bit in a control register.

16. The article of claim 14, further comprising instructions operative to cause the machine to access a local memory.

17. The article of claim 14, wherein the instructions operative to cause the machine to route a memory access from the processor core include instructions operative to cause the machine to route a memory access from a digital signal processor core.

18. The article of claim 16, wherein the instructions operative to cause the machine to access the local memory include instructions operative to write instructions to a local instruction memory.

19. The article of claim 16, wherein the instructions operative to cause the machine to access the local memory include instructions operative to cause the machine to access a Level 1 (L1) SRAM (Static Random Access Memory).

20. A system comprising:
a processor comprising
a local memory including a local data memory and a local instruction memory,
a first port coupled to the local data memory, and
a second port coupled to the local data memory and the local instruction memory; and
a bus interface including
a first bus coupled to the first port,
a second bus coupled to the second port,
a bridge between the first bus and the second bus, and
a multiplexing unit operative to switch between the second bus and the bridge to enable information placed onto the first bus to be re-routed into the second port without traversing memory external to the processor; and
a USB (Universal Serial Bus) interface.

21. The system of claim 20, wherein the local memory comprises a Level 1 SRAM (Static Random Access Memory).

22. The system of claim 20, wherein the first port comprises a fill port and the first port comprises a fill bus.

23. The system of claim 20, wherein the second port comprises a DMA (Direct Memory Access) controller port and the second bus comprises a DMA bus.

24. The system of claim 20, wherein the processor core further comprises an interface coupled to the second port, said interface being operable to access the local data memory and local instruction memory.

25. The system of claim 24, wherein the interface is operable to write instructions to the local instruction memory.

26. Apparatus comprising:
a bus interface; and
a processor comprising a processor core and connected to the bus interface, the processor being operative to reroute a memory access from the processor back into the processor core through the bus interface without traversing memory external to the processor core,
wherein the processor is further operative to;
determine a status of a re-routing bridge in the bus interface;
determine an address of memory to be accessed; and
place the access on a bus back into the processor core in response to said bridge being enabled and said address being in a local memory address space.

27. The apparatus of claim 26, wherein the processor includes a local instruction memory.

28. The apparatus of claim 27 wherein the processor is operative to access the local instruction memory by rerouting a memory access through the bus interface.

29. Apparatus comprising:
a processor core including:
a memory including a local data memory and a local instruction memory;
a first port coupled to the local data memory; and
a second port coupled to the local data memory and the local instruction memory; and
a bus interface including a first bus coupled to the first port;
a second bus coupled to the second port;
a bridge between the first bus and the second bus;
a multiplexing unit operative to switch between the second bus and the bridge to enable information placed onto the first bus to be re-routed into the second port; and
a bus control unit operative to switch the multiplexing unit to the bridge in response to a bridge-enable flag being set and an address of a memory location associated with a memory access from the processor core falls within the local memory address space.

30. A system comprising:
a processor comprising;
a local memory including a local data memory, a local instruction memory, and an address space;
a first port coupled to the local data memory, and
a second port coupled to the local data memory and the local instruction memory; and
a bus interface including
a first bus coupled to the first port,
a second bus coupled to the second port,
a bridge between the first bus and the second bus, and
a multiplexing unit operative to switch between the second bus and the bridge to enable information placed onto the first bus to be re-routed into the second port without traversing memory external to the processor;
a USB (universal Serial Bus) interface; and
a bus control unit operative to switch the multiplexer unit to the bridge in response to a bridge-enable flag being set and an address of a memory location associated with a memory access from the processor core falls within the local memory address apace.

* * * * *